United States Patent [19]

Suthersan

[11] Patent Number: 5,554,290
[45] Date of Patent: Sep. 10, 1996

[54] INSITU ANAEROBIC REACTIVE ZONE FOR INSITU METALS PRECIPITATION AND TO ACHIEVE MICROBIAL DE-NITRIFICATION

[75] Inventor: Suthan S. Suthersan, Yardley, Pa.

[73] Assignee: Geraghty & Miller, Inc., Denver, Colo.

[21] Appl. No.: 420,234

[22] Filed: Apr. 11, 1995

[51] Int. Cl.⁶ .................................................... C02F 3/28
[52] U.S. Cl. ......................... 210/610; 210/717; 210/747; 210/170; 210/912; 435/262.5
[58] Field of Search ................................ 210/610, 611, 210/747, 901, 198, 1, 170, 903, 717, 912; 166/246, 312, 68; 405/128; 435/262, 262.5, 264

[56] References Cited

U.S. PATENT DOCUMENTS

| | | | |
|---|---|---|---|
| 33,102 | 10/1989 | Visser et al. | 166/267 |
| 825,745 | 7/1906 | Mitchell . | |
| 1,286,666 | 12/1918 | Layne . | |
| 1,877,915 | 9/1932 | Lewis . | |
| 2,104,327 | 1/1938 | Kotzebue | 166/21 |
| 2,180,400 | 11/1949 | Coberly | 103/46 |
| 2,523,091 | 9/1950 | Bruce | 166/2 |
| 2,635,696 | 4/1953 | Asketh | 166/1 |
| 2,765,850 | 10/1956 | Allen | 166/39 |
| 2,875,831 | 3/1959 | Martin et al. | 166/9 |
| 2,969,226 | 1/1961 | Huntington | 262/3 |
| 3,216,905 | 11/1965 | Baptist | 195/2 |
| 3,277,962 | 10/1966 | Flickinger et al. | 166/15 |
| 3,351,132 | 11/1967 | Dougan et al. | 166/11 |
| 3,547,190 | 12/1970 | Wilkerson | 166/75 |
| 3,649,533 | 3/1972 | Reijonen et al. | 210/50 |
| 3,653,438 | 4/1972 | Wagner | 166/266 |
| 3,665,716 | 5/1972 | Rogers et al. | 61/35 |
| 3,705,851 | 12/1972 | Brauer | 210/1 |

(List continued on next page.)

FOREIGN PATENT DOCUMENTS

3427532C1 8/1985 Germany .

OTHER PUBLICATIONS

In Situ Aeration of Groundwater: A Technology Overview–Oct. 16, & 17, 1990.
Proceedings of the NWWA/API Conference on Petroleum Hydrocarbons and Organic Chemicals in Ground Water–Prevention, Detection and Restoration–Nov. 13–15, 1985.
Fifth National Outdoor Action Conference on Aquifer Restoration, Ground Water Monitoring, and Geophysical Methods—May–13–16, 1991 (Ground Water Mgmt., Book 5 of the Series).
The Fifth National Symposium and Exposition on Aquifer Restoration and Ground Water Monitoring–May 21–24, 1985.
HAZTECH International '88–Hazardous Waste & Hazardous Materials Management–Sep. 20–22, 1988.

(List continued on next page.)

Primary Examiner—Christopher Upton
Attorney, Agent, or Firm—Standley & Gilcrest

[57] ABSTRACT

An insitu method and system for removing dissolved heavy metals and nitrates from groundwater is disclosed. The invention comprises the formation of insitu anaerobic reactive zones to precipitate and filter out dissolved heavy metals as metallic sulfides and to degrade nitrate to nitrogen gas. The invention is comprised of an injection well or wells into a saturated zone that contains dissolved heavy metals or nitrate contaminated groundwater. A conduit, located within the injection well, pumps carbohydrates in the case of nitrates, into the contaminated groundwater. Indigenous microbes digest the carbohydrates, producing an anaerobic condition within the reactive zones. In the presence of sulfates, the sulfates are reduced to sulfide ions. The sulfides readily combine with the dissolved heavy metal ions and form insoluble precipitates. The resultant precipitates are filtered out by the soil matrix within and down gradient of the reactive zones. In the case of nitrates, the anaerobic conditions formed within the reactive zones convert the nitrate first to nitrite and then to nitrogen gas which is eventually stripped out of the groundwater.

8 Claims, 2 Drawing Sheets

U.S. PATENT DOCUMENTS

| | | | |
|---|---|---|---|
| 3,727,686 | 4/1973 | Prates et al. | 166/261 |
| 3,735,815 | 5/1973 | Myers | 166/313 |
| 3,765,483 | 10/1973 | Vencil | 166/265 |
| 3,796,883 | 3/1974 | Smith et al. | 250/260 |
| 3,823,777 | 7/1974 | Allen et al. | 166/266 |
| 3,828,525 | 8/1974 | Copa et al. | 55/68 |
| 3,846,290 | 11/1974 | Raymond | 210/11 |
| 3,980,138 | 9/1976 | Knopik | 166/314 |
| 3,990,513 | 11/1976 | Perch | 166/267 |
| 4,016,930 | 4/1977 | Arnold | 166/266 |
| 4,026,355 | 5/1977 | Johnson et al. | 166/246 |
| 4,126,556 | 11/1978 | Swanson et al. | 210/242 |
| 4,167,973 | 9/1979 | Forte et al. | 166/267 |
| 4,183,407 | 1/1980 | Knopik | 166/314 |
| 4,241,787 | 12/1980 | Price | 166/105 |
| 4,283,212 | 8/1981 | Graham et al. | 62/18 |
| 4,296,810 | 10/1981 | Price | 166/265 |
| 4,303,127 | 12/1981 | Freel et al. | 166/266 |
| 4,306,961 | 12/1981 | Taciuk | 208/11 R |
| 4,323,122 | 4/1982 | Knopik | 166/267 |
| 4,366,846 | 1/1983 | Curati, Jr. | 141/1 |
| 4,369,839 | 1/1983 | Freeman et al. | 166/53 |
| 4,401,569 | 8/1983 | Jhaveri et al. | 210/610 |
| 4,435,292 | 3/1984 | Kirk et al. | 210/747 |
| 4,442,901 | 4/1984 | Zison | 166/369 |
| 4,469,176 | 9/1984 | Zison et al. | 166/250 |
| 4,518,399 | 5/1985 | Croskell et al. | 55/16 |
| 4,544,381 | 10/1985 | Schmidt | 55/89 |
| 4,588,506 | 5/1986 | Raymond et al. | 210/606 |
| 4,593,760 | 6/1986 | Visser et al. | 166/267 |
| 4,660,639 | 4/1987 | Visser et al. | 166/267 |
| 4,662,900 | 5/1987 | Ottengraf | 55/90 |
| 4,723,968 | 2/1988 | Schippert et al. | 55/80 |
| 4,730,672 | 3/1988 | Payne | 166/266 |
| 4,738,206 | 4/1988 | Noland | 110/346 |
| 4,745,850 | 5/1988 | Bastian et al. | 98/56 |
| 4,755,304 | 7/1988 | Hallberg et al. | 210/747 |
| 4,765,902 | 8/1988 | Ely et al. | 210/610 |
| 4,782,625 | 11/1988 | Gerken et al. | 47/1.42 |
| 4,799,878 | 1/1989 | Schaeffer | 431/202 |
| 4,806,148 | 2/1989 | Ottengraf | 55/223 |
| 4,832,122 | 5/1989 | Corey et al. | 166/266 |
| 4,842,448 | 6/1989 | Koerner et al. | 405/258 |
| 4,846,134 | 7/1989 | Perry et al. | 123/520 |
| 4,848,460 | 7/1989 | Johnson, Jr. et al. | 166/245 |
| 4,850,745 | 7/1989 | Hater et al. | 405/258 |
| 4,864,942 | 9/1989 | Fochtman et al. | 110/226 |
| 4,872,994 | 10/1989 | Jakob | 210/691 |
| 4,886,119 | 12/1989 | Bernhardt et al. | 166/267 |
| 4,890,673 | 1/1990 | Payne | 166/266 |
| 4,895,085 | 1/1990 | Chips | 110/346 |
| 4,919,570 | 4/1990 | Payne | 405/128 |
| 4,945,988 | 8/1990 | Payne et al. | 166/266 |
| 4,951,417 | 8/1990 | Gerken et al. | 47/1.42 |
| 4,954,258 | 9/1990 | Little | 210/610 |
| 4,982,788 | 1/1991 | Donnelly | 166/266 |
| 5,006,250 | 4/1991 | Roberts et al. | 210/610 |
| 5,076,727 | 12/1991 | Johnson et al. | 405/128 |
| 5,080,793 | 1/1992 | Urlings | 210/603 |
| 5,180,503 | 1/1993 | Gorelick et al. | 210/758 |
| 5,277,815 | 1/1994 | Beeman | 210/605 |
| 5,302,286 | 4/1994 | Semprini et al. | 210/610 |
| 5,384,048 | 1/1995 | Hazen et al. | 210/747 |
| 5,441,641 | 8/1995 | Vail et al. | 210/747 |

OTHER PUBLICATIONS

Volume II, Proceedings of Petroleum Hydrocarbons and Organic Chemicals in Ground Water: Prevention, Detection and Restoration–Nov. 9–11, 1988.

Public Notice (3 pages).

Declaration Statement–Record of Decision; Rod Decision Summary (with attachments); and Responsive Summary, Upjohn Manufacturing Company, Superfund Site, Barceloneta, Puerto Rico.

LEXIS NEXIS–Environmental Protection Agency, Upjohn Manufacturing Company–Sep. 30, 1988.

Near Surface Geochemical Monitoring of Underground Gas Storage Facilities–Apr. 1986.

SPL External Vapor Vending (Elimination) Program–Nov. 2, 1983.

Water Well Technology–Field Principals of Exploration Drilling and Development of Ground Water and Other Selected Minerals (4 page cover and pages 240–308) (Michael D. Campbell and Jay H. Lehr).

Ground Water and Wells–A Reference Book for the Water–Well Indusry–4th Printing 1975, Chapter 10, pp. 185–208 and Chapter 20, pp. 375–394.

Hydrogeologic and Geochemical Investigation, Mt. Olive Greens, Mt. Olive Township, N.J.–Nov., 1982.

A Monitoring and Removal Program for Leaked Propane Gas in the Vadose (Unsaturated) Zone: A Case Study (Thomas Lobasso, Jr. and Andrew J. Barber).

INSITU ANAEROBIC REACTIVE ZONE FOR INSITU METALS PRECIPITATION AND TO ACHIEVE MICROBIAL DE-NITRIFICATION

BACKGROUND AND SUMMARY OF THE INVENTION

This invention relates to a method and apparatus for removing contaminants dissolved in groundwater.

Contamination of the groundwater with potentially hazardous materials is a common problem facing industry, the government and the general public. Frequently, as a result of spills, leakage from storage facilities or surface discharges, contaminants percolate into groundwater, thereby posing a health threat to drinking water supplies. While groundwater is not as susceptible to pollution as surface water, once polluted, its restoration is difficult and long term. Various methods for withdrawing and treating contaminated groundwater have met with limited success. Typically, groundwater is removed from the saturated zone, treated and then returned to the saturated zone. This method involves great expense and incurs risks inherent in treating heavy metals and other contaminants, such as nitrates, present in the subsurface.

The method and apparatus of the present invention utilizes the principle of insitu reactive zones for metal precipitation. Precipitation is a process of producing a separable solid phase within a liquid medium. The method may involve installing injection wells into the saturated zone of contaminated soil. A substantially impervious well casing may be placed in the borehole with a fluid-permeable section at its base. Carbohydrates and sulfates may be metered into the conduit under pressure to facilitate proper mixing and dispersion in the saturated zone. Optionally, a mixing pump at the base of the conduit may be utilized to provide a more homogeneous mixture within the conduit. The mixture may then permeate through the fluid-permeable screen of the conduit at its base and mix with the surrounding groundwater. Heterotrophic and sulfate reducing microorganisms indigenous to the soil microflora may then serve as a catalyst for the precipitation process. Two reactions involving the microbes form part of the present invention. The first reaction utilizes the carbohydrates and the dissolved oxygen in the groundwater to form carbon dioxide and water. The result of the first reaction causes a depletion in the oxygen level and leads to the formation of anaerobic conditions in the groundwater. As a result, the sulfates present are reduced to form sulfide ions. These sulfide ions then react with the dissolved heavy metals to form a solid precipitate which eventually is filtered out by the soil matrix. There is no need to remove the precipitate from the soil matrix because it is an insoluble, harmless precipitate.

Instead of injecting carbohydrates and sulfates separately via two injection streams this invention may utilize molasses extract to introduce both carbohydrates and sulfates.

As an example, the following reactions are indicative of the process utilizing sugar with sulfate to precipitate, dissolved lead, Zinc, Mercury and Nickel from groundwater:

$C_6H_{12}O_6 + 6O_2 \Rightarrow 6CO_2 + 6H_2O$ $3SO_4^{2-} + C_6H_{12}O_6 \Rightarrow 6CO_2 + 6H_2O + 3S^{2-}$ $Pb^{2+} + S^{2-} \Rightarrow PbS\downarrow$ $Zn^{2+} + S^{2-} \Rightarrow ZnS\downarrow$ $Ni^{2+} + S^{2-} \Rightarrow NiS\downarrow$ $Hg^{2+} + S^{--} \Rightarrow HgS\downarrow$ The use of molasses extract to achieve these reactions is a unique application. The concept of precipitating these metals in an insitu reactive zone rather than in an above ground aqueous phase reactor is also a unique development. The hydrogeological manipulations used in this invention to cause a homogeneous insitu reactive zone in all three dimensions is also unique. Using the soil matrix itself to filter out the insoluble metal precipitates is also unique.

The insitu reactive zone concept can also be applied to microbially denitrify the dissolved nitrates ($NO_3^-$) to nitrogen gas. The technologies used today to decontaminate dissolved $NO_3^-$ in groundwater involves pumping the contaminated groundwater and using above ground technologies, such as ion exchange beds, reverse osmosis or anaerobic bioreactors. In this invention, injection of carbohydrates alone will create an anaerobic zone due to the depletion of the dissolved oxygen. Then the denitrifying microbial consortia will degrade the $NO_3^-$ ion first to nitrite ion ($NO_2^-$) and eventually nitrogen ($N_2$) gas. The nitrogen gas, thus formed, will be eventually stripped into the soil gas. Thus, completely removing the dissolved nitrate contamination from the groundwater.

$C_6H_{12}O_6 + 6O_2 \rightarrow 6O_2 + 6H_2$ $NO_3^- \rightarrow NO_2^- \rightarrow N_2\uparrow$ The present invention may be practiced utilizing single injection wells or in multiple clusters depending upon the depth of the saturated zone, the geology of the remediation site and the degree of mixing that may be created by each individual injection well. It may be appreciated that required microbial cultures may be added to the soil matrix. This may be required where the indigenous microbes are not present in sufficient numbers to initiate the reactions.

Objects and advantages of the present invention will be readily apparent upon a reading of the following description.

DETAILED DESCRIPTION OF PREFERRED EMBODIMENTS

The preferred method and apparatus herein described are not intended to be exhaustive or to limit the invention to the precise forms disclosed. They are chosen and described to explain the principles of the invention, and the application of the method to practical uses, so that others skilled in the art may practice the invention.

Figure 1:
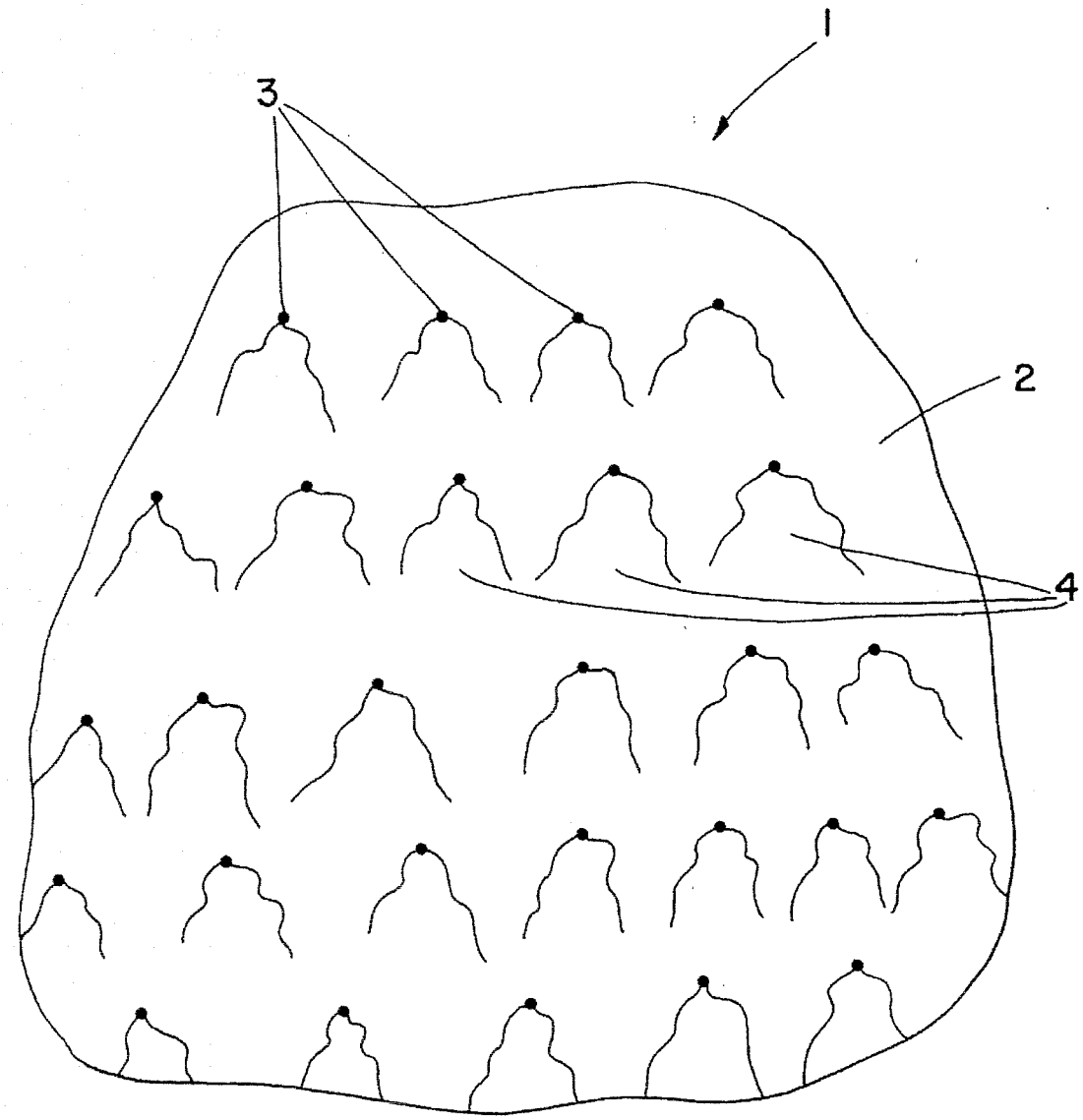
FIG. 1 is a plan view of a preferred embodiment of the present invention.

FIG. 1 shows a plan view of a preferred embodiment of the present invention in operation at 1 which depicts the contaminant plume 2 consisting of dissolved heavy metals or dissolved nitrate. Injection wells 3 are installed below the water table. Insitu reactive zones 4 are created by injecting molasses extract in the case of heavy metals and carbohydrates alone in the case of nitrate.

Figure 2:
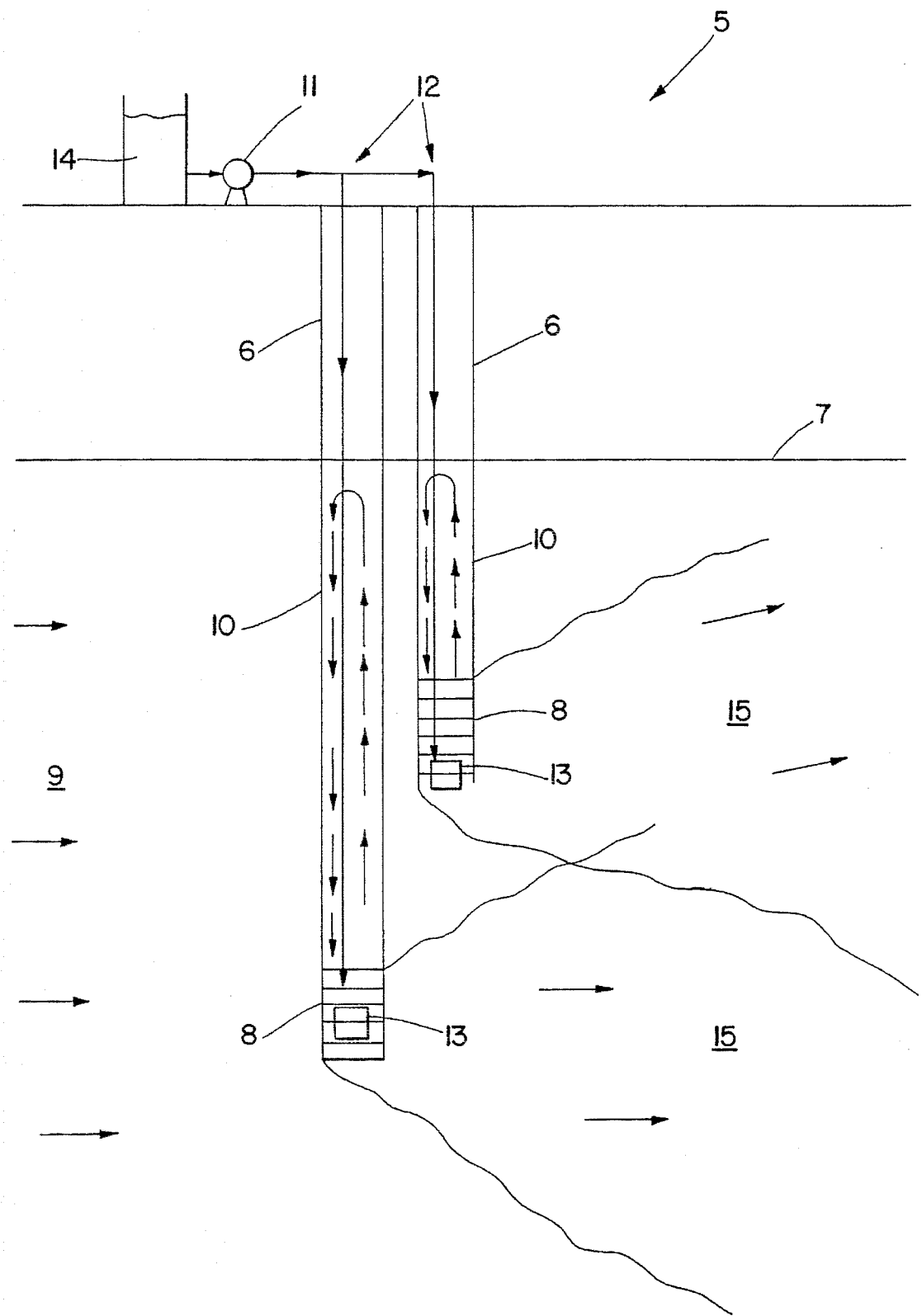
FIG. 2 is a cross-sectional view of another embodiment of the present invention.

FIG. 2 shows a cross-sectional view of another embodiment of the present invention operation at 5 which depicts the dissolved contaminant plume. Injection wells 6 are installed below the water table 7 and screens 8 are installed in the contaminated zone 9. The wells consist of impermeable well sections 10 and the screens 8.

A metering pump 11 is operationally attached in communication with the injection wells 6 at 12. Optionally, mixing pump 13 may be placed within the wells 6 to facilitate mixing of the injected reagents. Reagent stock solution is held in a holding tank 14.

Operation of the present invention may also be understood with reference to FIG. 2. Metering pump 11 may be operated to provide molasses extract (for heavy metals precipitation) and carbohydrates (for nitrate removal) below the water table 7 under pressure. This is to facilitate the reagents to be injected under pressure to form the insitu reactive zones 15 in a homogeneous manner in all three dimensions. If the reagents are fed by gravity alone into the injection wells 6, only a two-dimensional reactive zone will be formed around the top near the water table 7. Mixing pump 13 may be operated to mix the reagents as is shown by the counter-clockwise arrows within the conduit.

The indigenous microbes then digest the carbohydrates utilizing the available dissolved oxygen within the reactive zones 15 to produce carbon dioxide and water, thereby forming anaerobic conditions within the reactive zones 15. The sulfates are converted to sulfide ($S^{2-}$) within these anaerobic reactive zones 15. These sulfide ions then combine with the dissolved heavy metal ($Me^{++}$) ions, contaminating the groundwater, to form metallic sulfide precipitates out of the groundwater. The soil matrix within and down gradient of the reactive zone will filter the precipitates and bind them with the soil matrix.

$$Me^{30+} + S^- \rightarrow MeS\downarrow$$

In the case of $NO_3^-$ contaminated plumes, the indigenous microbes will digest the carbohydrates utilizing the available dissolved oxygen within the reactive zones 15, to form $CO_2$ and $H_2O$, thus forming anaerobic conditions within the reactive gas zones 15. The nitrates present in the reactive zones will be converted $NO_2^-$ (nitrite) first and nitrogen gas by the indigenous denitrifying microbes.

$$NO_3^- \rightarrow NO_2^- \rightarrow N_2$$

The scope of the invention is not to be considered limited by the above disclosure, and modifications are possible without departing from the spirit of the invention as evidenced by the following claims.

What is claimed is:

1. A method for removing contaminants dissolved in ground water, comprising the steps of:

establishing an injection well from the ground surface to a saturated zone contaminated with heavy metal compounds;

placing a conduit within said injection well, wherein said conduit has a fluid-permeable section below the water table of said contaminated saturated zone; and supplying carbohydrates and sulfates capable of being utilized by an indigenous population of microorganisms to said conduit such that said carbohydrates and said sulfates are forced out of said fluid-permeable section into said contaminated saturated zone whereby the indigenous population of microorganism will metabolize said carbohydrates leading to the formation of anaerobic conditions and will metabolize said sulfates to produce sulfide ions which will cause the in-situ precipitation of the heavy metal compounds.

2. The method of claim 1, further comprising the step of mixing said carbohydrates and said sulfates in said injection well.

3. The method of claim 1, further comprising the step of supplying an additional population of microorganisms capable of metabolizing carbohydrates and sulfates to said contaminated saturated zone, wherein said additional population of microorganisms will metabolize said carbohydrates leading to the formation of anaerobic conditions and will metabolize said sulfates to produce sulfide ions which will cause the in-situ precipitation of the heavy metal compounds.

4. The method of claim 1, wherein the step of supplying carbohydrates and sulfates comprises the steps of placing a pump in fluid communication with said conduit and operating said pump to force said carbohydrates and said sulfates out of said fluid-permeable section of said conduit.

5. The method of claim 1, wherein the step of supplying carbohydrates and sulfates comprises supplying molasses extract to said conduit.

6. A system for removing dissolved contaminants from ground water, comprising:

an injection well extending from a ground surface to below the water table of said ground water;

a conduit within said injection well, wherein said conduit is substantially impermeable above said water table and has a fluid-permeable section below said water table;

a supply of carbohydrate and sulfates; and a pump in communication with said conduit for supplying said carbohydrates and sulfates under pressure sufficient to force said carbohydrates and sulfates out of said fluid-permeable section and into said ground water where the indigenous population of microorganisms will metabolize said carbohydrates leading to the formation of anaerobic conditions and will metabolize said sulfates to produce sulfide ions which will cause the in-situ precipitation of heavy metal compounds.

7. The apparatus of claim 6, further comprising a mixing pump within said conduit for mixing said carbohydrates and sulfates.

8. The apparatus of claim 6, further comprising a supply of carbohydrate and sulfate metabolizing microbes.

* * * * *

UNITED STATES PATENT AND TRADEMARK OFFICE
CERTIFICATE OF CORRECTION

PATENT NO. : 5,554,290

DATED : September 10, 1996

INVENTOR(S) :
Suthan S. Suthersan

It is certified that error appears in the above-indentified patent and that said Letters Patent is hereby corrected as shown below:

In column 2, line 53, please delete the word "an" and replace it with --art--.

In column 4, line 6, please delete the word "microorganism" and replace it with --microorganisms--.

In column 4, line 38, please delete the word "carbohydrate" and replace it with --carbohydrates--.

Signed and Sealed this

Twenty-fourth Day of December, 1996

Attest:

BRUCE LEHMAN

*Attesting Officer*   *Commissioner of Patents and Trademarks*